US007449793B2

(12) United States Patent
Cho et al.

(10) Patent No.: US 7,449,793 B2
(45) Date of Patent: Nov. 11, 2008

(54) PORTABLE RANGE EXTENDER WITH AUTONOMOUS CONTROL OF STARTING AND STOPPING OPERATIONS

(75) Inventors: Chahee Peter Cho, Centreville, VA (US); Eun Shik Kim, Centreville, VA (US)

(73) Assignee: Bluwav Systems, LLC, Rochester Hills, MI (US)

( * ) Notice: Subject to any disclaimer, the term of this patent is extended or adjusted under 35 U.S.C. 154(b) by 163 days.

(21) Appl. No.: 10/779,600

(22) Filed: Feb. 18, 2004

(65) Prior Publication Data

US 2005/0179262 A1    Aug. 18, 2005

(51) Int. Cl.
*F02B 63/04* (2006.01)
*H02K 7/18* (2006.01)
*F02D 29/06* (2006.01)
*H02P 9/04* (2006.01)

(52) U.S. Cl. .................................... 290/1 A; 290/40 B
(58) Field of Classification Search ................. 290/1 A, 290/40 B
See application file for complete search history.

(56) References Cited

U.S. PATENT DOCUMENTS

| | | | | |
|---|---|---|---|---|
| 1,111,510 | A | | 9/1914 | Ward .......................... 180/65.4 |
| 2,898,542 | A | * | 8/1959 | Cholick et al. ................ 322/90 |
| 3,340,748 | A | * | 9/1967 | Young .......................... 74/661 |
| 3,497,027 | A | | 2/1970 | Wild .......................... 180/65.4 |
| 4,022,083 | A | * | 5/1977 | Pollak-Banda et al. .... 74/665 B |
| 4,106,603 | A | | 8/1978 | Walter ..................... 192/85 AB |
| 4,392,393 | A | * | 7/1983 | Montgomery ................. 74/661 |
| 4,448,157 | A | * | 5/1984 | Eckstein et al. ........ 123/142.5 R |
| 4,533,011 | A | * | 8/1985 | Heidemeyer et al. ........ 180/65.2 |

(Continued)

FOREIGN PATENT DOCUMENTS

DE  102 45 088 B3   1/2004

(Continued)

OTHER PUBLICATIONS

International Preliminary Report on Patentability, for PCT/US2005/002018, 6 pages.

*Primary Examiner*—Darren Schuberg
*Assistant Examiner*—Pedro J Cuevas
(74) *Attorney, Agent, or Firm*—Proskauer Rose LLP (57) ABSTRACT

A portable range extender can be used to supply electrical power to an electric vehicle operable by an electric traction motor. The portable range extender includes an engine, a dynamoelectric machine coupled to the engine by a shaft, an autonomous range extender controller for controlling operations of the range extender independently of a controller for the vehicle, and circuitry associated with the engine and machine. To start operation, electrical energization is applied from the vehicle battery to the dynamoelectric machine for operation as a motor to drive the shaft. As the shaft accelerates, the rotational speed of the shaft and the temperature of the engine are sensed. When the speed and temperature obtain predetermined thresholds, fuel is supplied to the engine and ignition is activated. The engine then operates as a prime mover to drive the shaft in lieu of the machine. After a period of engine prime mover operation, the machine is activated for operation as a generator to provide an electrical current output for charging the battery or supplying energy to the traction motor. When range extender operation is to be stopped, fuel supply is cut off before ignition termination to avoid engine backfire.

58 Claims, 5 Drawing Sheets

U.S. PATENT DOCUMENTS

| | | | |
|---|---|---|---|
| 4,540,888 A * | 9/1985 | Drewry et al. | 290/1 R |
| 4,556,247 A * | 12/1985 | Mahaffey | 322/1 |
| 4,595,841 A * | 6/1986 | Yaguchi | 290/1 A |
| 4,647,835 A * | 3/1987 | Fujikawa et al. | 322/1 |
| 4,762,170 A * | 8/1988 | Nijjar et al. | 165/43 |
| 4,835,405 A * | 5/1989 | Clancey et al. | 290/1 A |
| 4,961,403 A * | 10/1990 | Kawaguchi et al. | 123/2 |
| 5,253,891 A * | 10/1993 | Carlin et al. | 280/422 |
| 5,264,764 A | 11/1993 | Kuang et al. | 318/139 |
| 5,333,678 A * | 8/1994 | Mellum et al. | 165/42 |
| 5,865,263 A * | 2/1999 | Yamaguchi et al. | 180/65.2 |
| 5,899,174 A * | 5/1999 | Anderson et al. | 123/2 |
| D416,858 S * | 11/1999 | Domanski | D13/114 |
| 6,018,200 A * | 1/2000 | Anderson et al. | 290/40 B |
| 6,026,921 A * | 2/2000 | Aoyama et al. | 180/65.2 |
| 6,093,974 A * | 7/2000 | Tabata et al. | 290/40 R |
| 6,100,599 A * | 8/2000 | Kouchi et al. | 290/1 A |
| 6,193,903 B1 | 2/2001 | Gay et al. | 252/62.55 |
| 6,274,943 B1 | 8/2001 | Hasegawa et al. | 290/40 C |
| 6,278,915 B1 * | 8/2001 | Deguchi et al. | 701/22 |
| 6,306,056 B1 * | 10/2001 | Moore | 475/5 |
| 6,333,620 B1 | 12/2001 | Schmitz et al. | 320/132 |
| 6,389,807 B1 * | 5/2002 | Suzuki et al. | 60/285 |
| 6,396,165 B1 * | 5/2002 | Nagano et al. | 307/10.6 |
| 6,414,399 B1 * | 7/2002 | Bianchi | 290/1 A |
| 6,421,599 B1 * | 7/2002 | Lippa et al. | 701/102 |
| 6,424,891 B1 * | 7/2002 | Sargent et al. | 701/29 |
| 6,463,375 B2 * | 10/2002 | Matsubara et al. | 701/54 |
| 6,474,068 B1 * | 11/2002 | Abdel Jalil et al. | 60/716 |
| 6,485,579 B1 | 11/2002 | Nillius et al. | 148/104 |
| 6,492,756 B1 | 12/2002 | Maslov et al. | 310/156.12 |
| 6,522,960 B2 * | 2/2003 | Nada | 701/22 |
| 6,608,393 B2 * | 8/2003 | Anderson | 290/1 A |
| 6,622,804 B2 | 9/2003 | Schmitz et al. | 180/65.2 |
| 6,675,758 B2 * | 1/2004 | Nagata et al. | 123/192.1 |
| 6,677,684 B1 * | 1/2004 | Kennedy | 290/4 C |
| 6,722,458 B2 * | 4/2004 | Hofbauer | 180/65.4 |
| 6,753,620 B2 * | 6/2004 | Fukuda | 290/1 A |
| 6,756,693 B2 * | 6/2004 | Kennedy | 290/1 A |
| 6,758,788 B2 * | 7/2004 | Itou | 477/8 |
| 6,784,560 B2 * | 8/2004 | Sugimoto et al. | 290/1 R |
| 6,812,582 B2 * | 11/2004 | Kennedy | 290/1 A |
| 6,849,961 B2 * | 2/2005 | Takizawa et al. | 290/1 A |
| 6,877,581 B2 * | 4/2005 | Badr et al. | 180/311 |
| 6,889,125 B2 * | 5/2005 | Nakao et al. | 701/22 |
| 6,894,625 B1 * | 5/2005 | Kozma et al. | 340/950 |
| 6,953,021 B2 * | 10/2005 | Wakashiro et al. | 123/321 |
| 6,986,331 B2 * | 1/2006 | Mizutani | 123/179.15 |
| 7,034,410 B2 * | 4/2006 | Kennedy | 290/1 A |
| 7,049,707 B2 * | 5/2006 | Wurtele | 290/1 B |
| 7,119,450 B2 * | 10/2006 | Albrecht | 290/1 A |
| 7,150,159 B1 * | 12/2006 | Brummett et al. | 62/236 |
| 7,159,572 B2 * | 1/2007 | Mizutani | 123/491 |
| 7,178,618 B2 * | 2/2007 | Komeda et al. | 180/65.2 |
| 7,224,132 B2 * | 5/2007 | Cho et al. | 318/139 |
| 7,226,385 B2 * | 6/2007 | Tabata et al. | 477/5 |
| 7,238,133 B2 * | 7/2007 | Tabata et al. | 475/5 |
| 7,245,033 B2 * | 7/2007 | Wurtele | 290/1 A |
| 7,245,038 B2 * | 7/2007 | Albertson et al. | 290/44 |
| 7,259,469 B2 * | 8/2007 | Brummett et al. | 290/40 C |
| 7,273,027 B2 * | 9/2007 | Mizutani | 123/179.16 |
| 7,275,510 B2 * | 10/2007 | Mizutani | 123/179.4 |
| 7,291,932 B2 * | 11/2007 | Wurtele et al. | 290/1 B |
| 2002/0056993 A1 * | 5/2002 | Kennedy | 290/1 A |
| 2002/0096375 A1 | 7/2002 | Schmitz et al. | 180/65.2 |
| 2003/0051692 A1 * | 3/2003 | Mizutani | 123/179.15 |
| 2003/0070849 A1 * | 4/2003 | Whittaker | 180/68.2 |
| 2003/0098185 A1 * | 5/2003 | Komeda et al. | 180/65.2 |
| 2003/0193263 A1 | 10/2003 | Maslov et al. | 310/254 |
| 2004/0011918 A1 * | 1/2004 | Musial et al. | 244/1 R |
| 2004/0026928 A1 * | 2/2004 | Wakashiro et al. | 290/40 C |
| 2005/0211227 A1 * | 9/2005 | Mizutani | 123/491 |
| 2006/0157987 A1 * | 7/2006 | Albrecht | 290/1 A |
| 2007/0050119 A1 * | 3/2007 | Tamai et al. | 701/54 |
| 2007/0074701 A1 * | 4/2007 | Mizutani | 123/198 D |
| 2007/0095322 A1 * | 5/2007 | Mizutani | 123/179.16 |

FOREIGN PATENT DOCUMENTS

| | | |
|---|---|---|
| EP | 0 249 806 A | 12/1987 |
| EP | 1 298 772 A2 | 4/2003 |
| WO | WO 2005/082663 A1 | 0/2005 |
| WO | WO 00/74964 A | 12/2000 |
| WO | WO 01/79012 A | 10/2001 |

* cited by examiner

PORTABLE RANGE EXTENDER WITH AUTONOMOUS CONTROL OF STARTING AND STOPPING OPERATIONS

FIELD OF THE INVENTION

The present invention relates to electric power supply devices, and more particularly, to portable stand-alone electric power supply devices that can be utilized as range extenders for electric vehicles.

BACKGROUND ART

A typical range extender is provided as an integral part of a hybrid electric vehicle to improve its travel range. For example, U.S. Pat. No. 5,264,764 discloses a hybrid electric vehicle comprising an inverter/motor electric drive system, a vehicle controller, a range extender and a traction battery. The inverter/motor electric drive system is composed of an electric motor and an inverter/motor control unit. In response to a hand or foot actuated speed control actuator, a vehicle controller applies a torque command signal to the electric motor to drive the vehicle wheels through a transmission. The range extender, which includes an internal combustion engine and an alternator, is actuated by the vehicle controller to provide electric power to the inverter/motor drive system and/or the traction battery. The internal combustion engine rotationally drives the alternator to output electric power, which is applied to recharge the traction battery or to energize the motor. The inverter/motor control unit is responsive to the torque command signal to provide sufficient electric power from the traction battery and/or the range extender to the electric motor to drive the vehicle at a desired speed.

Another example of a range extender incorporated in a hybrid electric vehicle is disclosed in U.S. Pat. Nos. 6,622,804 and 6,333,620, which describe a series type hybrid electric vehicle including electric motors powered by a battery array, a vehicle control unit, an internal combustion engine and a generator driven by the internal combustion engine for charging the battery array. The internal combustion engine is controlled by the vehicle control unit to run continuously during operation of the vehicle. The charging of the battery array by the generator is controlled by the vehicle control unit depending on a driving mode of the vehicle, e.g., in accordance with power output, power consumption and rpm of the electric motors. The power generated by the generator is generally maintained constant but may be decreased if the state-of-charge of the battery array approaches an upper control limit at which the battery array may be overcharged, and may be increased if the state-of-charge approaches a lower control limit at which the battery array would be unable to drive the electric motors with enough torque to propel the vehicle appropriately.

The above-described systems are typical of a range extender that is designed specifically for the hybrid electric vehicle in which the range extender is installed. The range extender is controlled by the vehicle controller to interact with the electric motor of the vehicle. In a hybrid vehicle, the electric motor is used primarily for low-speed cruising or to provide extra power for acceleration or hill climbing. When braking or coasting to a stop, the hybrid vehicle uses its electric motor as a generator to produce electricity, which is then stored in its battery pack. Thus, the electric motor in hybrid vehicles improves fuel economy compared to a vehicle equipped only with an internal combustion engine. Unlike all-electric vehicles, which have a limited travel range and create inconvenience for users by requiring frequent recharging at charging sites, hybrid vehicles do not need to be plugged into an external source of electricity to charge batteries.

However, hybrid vehicles present challenges to be addressed in order to be suitable for widespread implementation. For economic feasibility of the hybrid vehicle, which can be more expensive than a non-hybrid vehicle, cost should be minimized and advantages should be attained from other vehicle operational considerations. Emissions caused by the internal combustion engine should be reduced or eliminated if possible. The weight and size considerations involved with the use of both electric motor propulsion and an internal combustion engine with its fuel supply are important factors in vehicles such as compact cars and trucks.

Hybrid vehicles and all-electric vehicles each have their advantages and disadvantages. Each type of vehicle obtains benefits from the provision of a range extender. The need exists for a portable range extender that can be electrically connected to an all-electric vehicle to enable the vehicle to travel longer distances, if necessary. For shorter travel distances that do not require range extender functionality, it would be desirable to avoid the weight of, and space occupied by, the unused range extender. The portability of a range extender would make it amenable to support vehicles of different types and be movable readily from one vehicle to another. Thus, it would be desirable that such portable range extender be operable independently of the controller of the vehicle. Improvements are also needed to reduce emissions and increase fuel efficiency.

DISCLOSURE OF THE INVENTION

The present invention fulfills the above described needs, at least in part, by provision of a portable range extender capable of supplying electrical energy to a vehicle. The range extender includes a dynamoelectric machine coupled to an internal combustion engine by a shaft. The dynamoelectric machine may be connected to a power source, such as a vehicle battery, to operate as a motor to drive the shaft in rotation when a user initiates starting of the engine. The shaft, and thus the engine, accelerates in rotation while being driven by the dynamoelectric machine, the engine temperature increasing during this warm-up period. The rotational speed and engine temperature are sensed and, when optimal values for each of these parameters are obtained as determined by a dedicated range extender controller, fuel is supplied to the engine and ignition is activated. The engine then acts as a prime mover to further accelerate shaft rotation. As the engine starts only upon optimal speed and temperature conditions, fuel economy is maximized. With a warm start, fuel is burned most efficiently, thus minimizing emissions. As speed increases further, a level is reached at which the dynamoelectric machine can be activated as a generator to provide an electrical current output. At that time the engine has the prime mover capability to support the electrical power generation. The range extender controller outputs a signal in response to speed input for generator activation. When range extender operation is to be terminated, fuel supply to the engine is cut off and ignition is thereafter maintained for a preset period. The fuel remaining in the engine is efficiently burned, thereby avoiding engine backfire and accompanying emission of fumes.

Although the power generated by the range controller may be applied to charge the vehicle battery and/or drive the vehicle traction motor and other electrical loads, the range controller operations are under the control of an autonomous controller. The range extender and its controlling circuitry are self contained within an enclosure that is independent of a vehicle with which it may be used. An inverter/converter module, coupled to the controller, inverts the direct current supply to alternating current to the dynamoelectric machine when it is in motor operation and converts an alternating current output of the dynamoelectric machine to direct current when it is in generator operation. Also coupled to the controller are an ignition circuit, a fuel supply circuit, speed sensor and temperature sensor. The controller is also provided with user input terminals, thus permitting control of the range extender to be independent of the controller of the vehicle.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
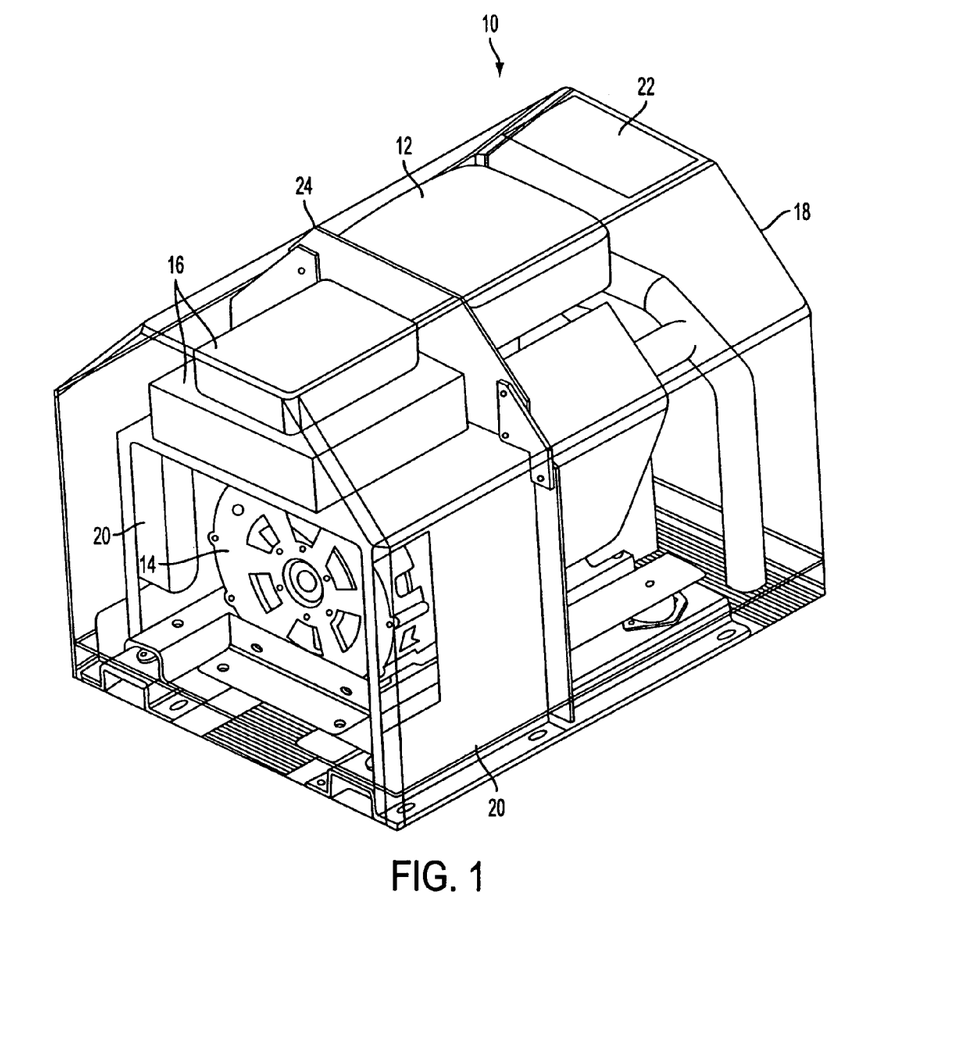
FIG. 1 is a perspective view of range extender elements configured in a preferred embodiment of the present invention.
Figure 2:
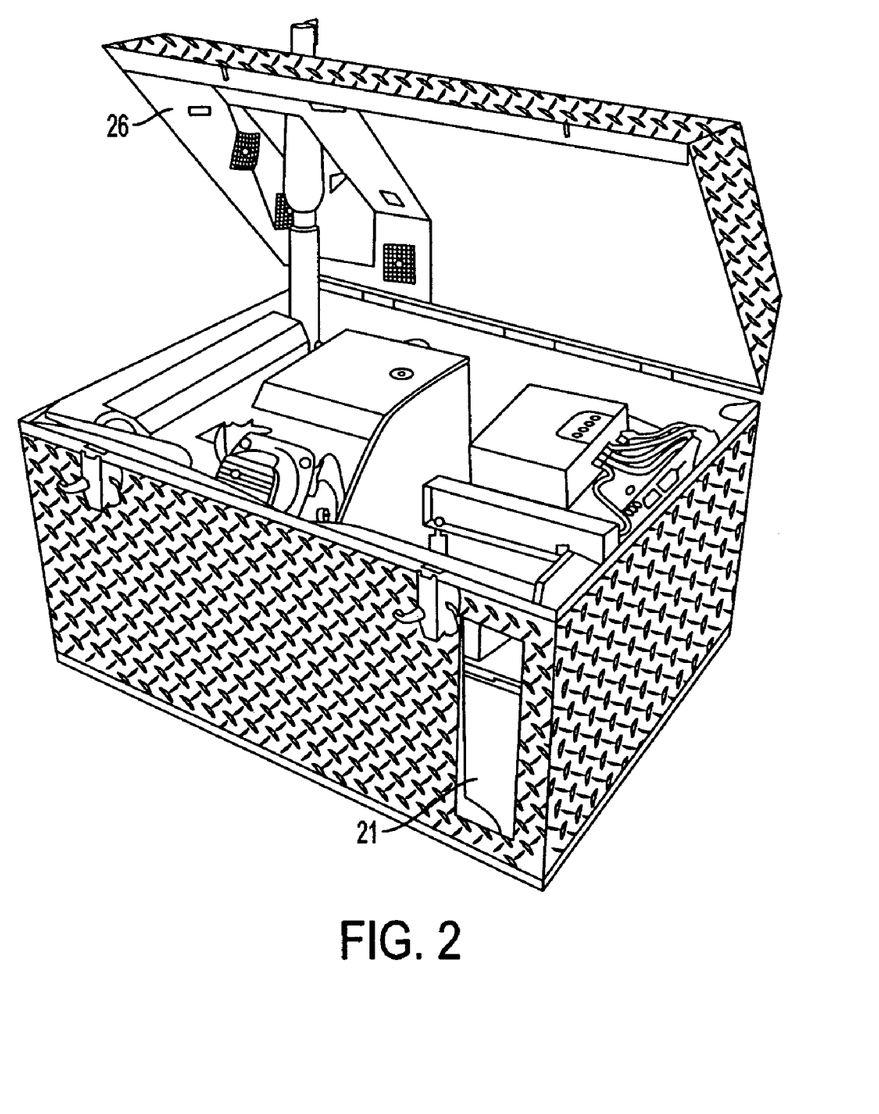
FIG. 2 is a view of the range extender elements of FIG. 1 shown with its enclosure.

FIG. 1 exemplifies a portable range extender 10 of the present invention. Prime mover 12, preferably an internal combustion engine, is coupled to dynamoelectric machine 14 by a common shaft. A controller and associated control circuitry are contained in a housing, the control system collectively indicated by reference numeral 16. As described further hereinafter, the control system is effective to control operations of both the engine 12 and the dynamoelectric machine 14. When operation of the range extender is initiated, the dynamoelectric machine 14 is controlled to operate as a motor for starting the engine 12. When prescribed engine conditions are detected, the control system 16 controls the dynamoelectric machine 14 to operate as a generator driven by the engine 12 to produce electrical power supplied to an external load. As a consequence of this control arrangement, there is no necessity for a separate starter motor for the engine, which is commonly provided in conventional motor-generator sets. The dynamoelectric machine 14 preferably may be a three phase AC electric machine, although other electrical machines may be employed. The three phase machine, which provides considerably more power than a conventional starter motor, can drive the engine at a higher speed in the starting mode and eliminates the need for a separate flywheel. Thus, the range extender 10 may be packaged in a compact integrated assembly covered by an enclosure 18, shown in phantom in FIG. 1, and further illustrated in FIG. 2. Within the enclosure, machine 14 and engine 12 are each contained in respective housings. The housing for engine 12 contains cool air inlet windows, one being indicated by reference numeral 20, in FIG. 1. The cool air inlet windows are in communication with corresponding windows 21 in the enclosure, as shown in FIG. 2. One or more hot air outlet windows 22 are provided in the enclosure. A divider 24 forms two chambers respectively for the engine and electrical machine. This arrangement provides efficient cooling as the cool air is directed first to the relatively cooler machine 14 and then to the engine 12. The enclosure is provided with a door 26 that easily may be opened to provide access for maintenance.

A compact structure is thus provided that enables a user to place the portable range extender into any battery-powered vehicle in order to extend its travel range by charging its battery or driving the vehicle instead of, or in combination with, the electric motor. For example, the range extender 10 may be placed in all-electric buses or vans to enable their use for longer trips. The range extender portability is also suitable for mounting in a trailer coupled to a vehicle. The range extender of the present invention may act as an auxiliary power unit not only for loads with substantial power consumption, such as trucks, recreational vehicles, etc., but may be used to supplement power requirements of any electrical load.

Figure 3:
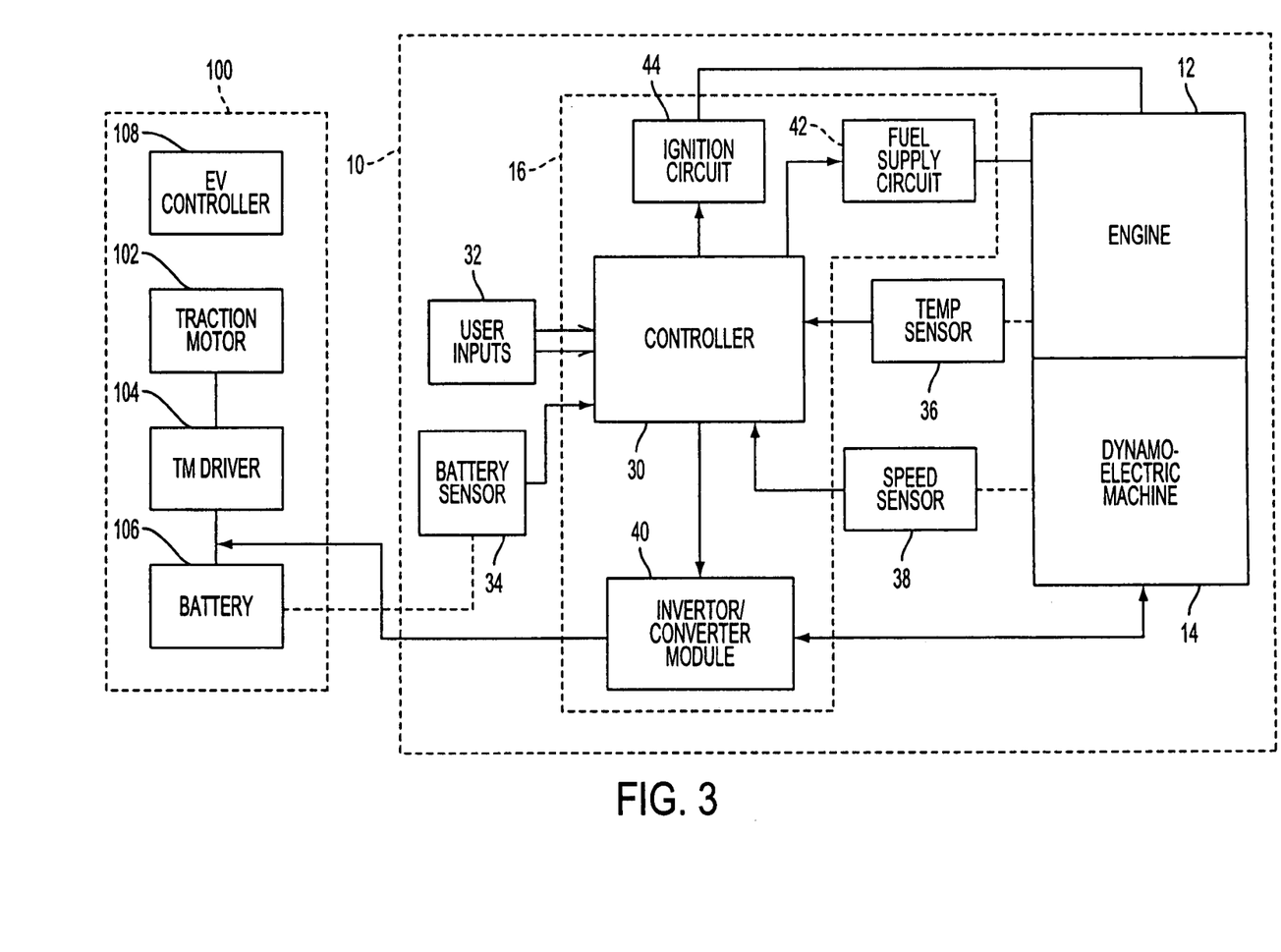
FIG. 3 is a block diagram of controlled operation of the range extender of FIG. 1, shown in relation to an electric vehicle.

FIG. 3 is a block diagram of an exemplary embodiment of the present invention, in which the range extender 10 is detachably connectable to a battery-powered vehicle 100 having a traction electric motor 102 driven by a traction motor driver 104 and powered by a battery 106. The traction motor 102 may be, for example, a permanent magnet DC brushless motor, such as disclosed in U.S. Pat. No. 6,492,756, issued Dec. 10, 2002 to Maslov et al., commonly assigned with the present invention. The high-voltage battery 106 can provide substantial electric power, for example, about 65 KW. The vehicle 100 is provided with an electric vehicle controller 108 for controlling typical operations of the electric vehicle. For example, in response to a torque request by the vehicle operator, the vehicle controller 108 may control the driver 104 to provide sufficient electric power from the battery 106 to the motor 102 to achieve the desired torque. The vehicle controller also may control the motor 102 to act as an electric generator to charge the battery 106 during a regeneration mode.

The range extender 10 is provided with an autonomous controller 30, such as a microcontroller, included within control system 16. The controller has a plurality of inputs, including user inputs 32 and inputs from battery sensor 34, engine temperature sensor 36 and speed sensor 38. The battery sensor provides an indication of the state of charge of the vehicle battery 106. Temperature sensor 36 provides indication of the engine temperature and speed sensor 38 provides a shaft speed feedback signal. The microcontroller can be programmable to control operations of the range extender in one or more modes. User inputs permit a user to select a particular operating mode or a manual operating mode.

Figure 4:
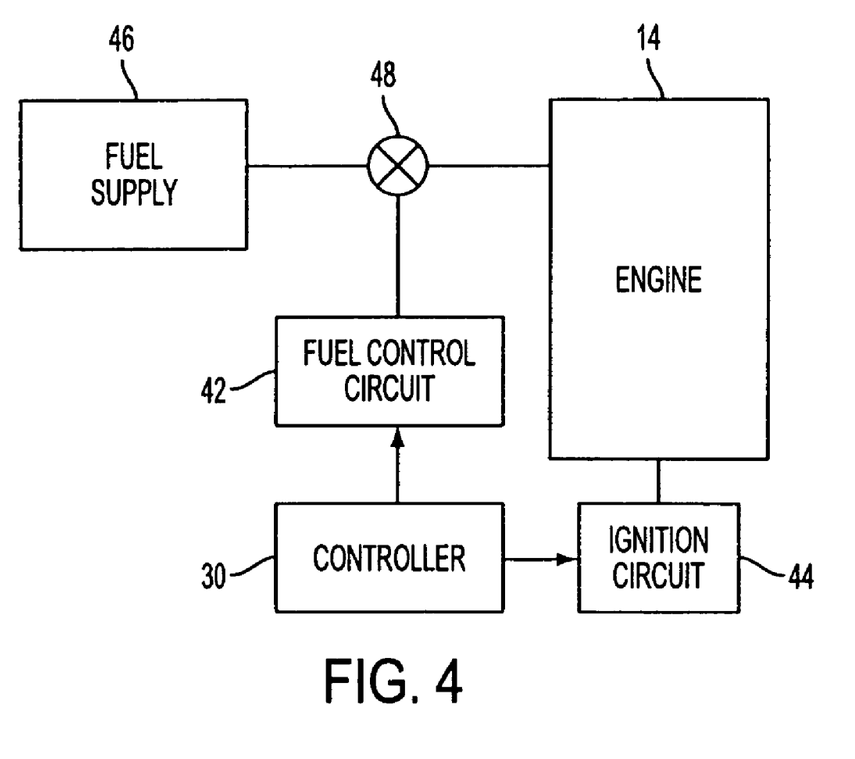
FIG. 4 is a block diagram of the fuel and ignition aspects of the range extender of FIG. 1.

Inverter/converter module 40 is detachably connectable to the vehicle 100 to provide a bidirectional transfer of power either from the battery 106 to the dynamoelectric machine 14 operating in the motoring mode during engine startup or from the dynamoelectric machine 14 operating in the generating mode to the battery 106. Under supervision of controller 30, module 40 operates to invert DC power from the battery 106 into 3-phase AC power for rotating the dynamoelectric machine 14 in the motoring mode, and converts 3-phase AC power generated by the dynamoelectric machine in the generating mode to DC power used for charging the battery 106 or driving the traction motor 102. Controller 30 is responsive to the range extender shaft speed as received from speed sensor 38 activate a switch circuit in the module 40 to activate generating operation when engine speed has obtained an appropriate level for driving the electrical machine 14. Controller 30 also provides output control signals to fuel supply circuit 42 and ignition circuit 44 during startup and turnoff phases of engine operation. As shown in FIG. 4, the fuel control circuit is responsive to controller 30 to regulate valve 48 and the flow of fuel from fuel supply 46 to engine 14. Valve 48 may be controlled to be switched between fully open or fully closed, or may be made variable between these extremes.

Figure 5:
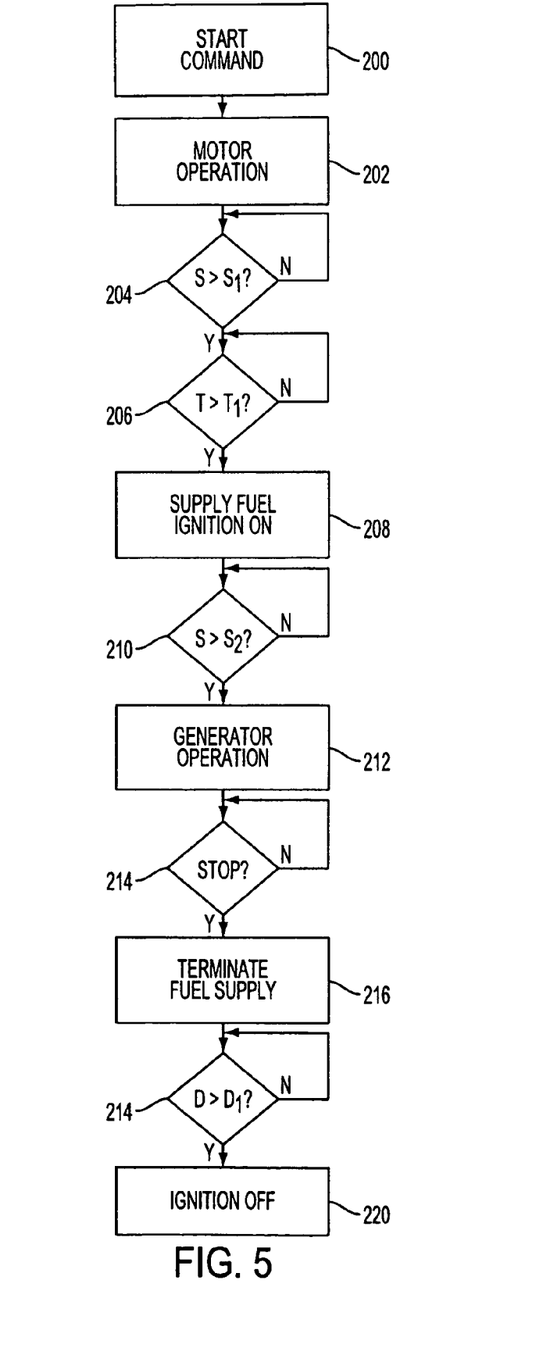
FIG. 5 is a flow chart of range extender operation in accordance with the present invention.

FIG. 5 is a flow chart of range extender operation. At step 200, a start command is issued, which may be initiated by a manual user operation, such as activation of a start switch. Alternatively, the start command may be issued pursuant an automatic operating mode of the controller. At step 202, controller 30 outputs control signals to module 40 to connect the battery 106 through a switch circuit in module 40 to machine 14 and to activate inverter operation. Dynamoelectric machine 14 thus receives alternating current power to operate as a motor to drive the shaft of the engine 12 and start the engine. Throughout operation, engine speed and temperature are sensed and input to the controller. At step 204, determination is made as to whether the shaft speed is at a sufficient level, S1, for engine operation. If not, machine motoring continues and step 204 is repeated. When the shaft speed has been determined to exceed SI, the sensed engine temperature is compared to a preset temperature threshold T1 at step 206. T1 represents the minimum engine temperature at which the engine can operate with satisfactory fuel efficiency. If the sensed temperature does not exceed T1, the engine continues to be driven by dynamoelectric machine 14 operating in a motoring mode and step 206 is repeated. When temperature threshold T1 is exceeded, the controller outputs control signals to fuel supply circuit 42 and ignition circuit 44 to initiate engine operation as a prime mover, at step 208. A control signal is also applied to module 40 to cease inverter operation, thus discontinuing operation of the machine 14 as a motor. Machine 14 thereafter will be operated as a generator to provide power for recharging battery 106 and/or to supply the traction motor 102. The minimum engine speed at which satisfactory generation can be achieved is represented by speed S2. Generally, S2 is greater than S1. At step 210, the sensed engine speed is compared with the threshold speed S2. S2 can be set in accordance with the expected electrical requirements of the particular battery and traction motor provided in the vehicle. Step 210 is repeated until the sensed speed is determined to have exceeded S2. At that time, the controller transmits a control signal to the module 40 at step 212. Module 40 is switched to provide direct current power, which is converted from the alternating current output of machine 14 operating as a generator, to the vehicle load.

Generator operation continues until a stop command is detected at step 214. The stop command may be sensed by the controller in response to a user input or in accordance with an automatic mode operation corresponding to a stored program. For example, such program may operate to initiate and terminate range extender operation in accordance with the state of charge of the battery. When the state of charge of the battery attains a level approaching a maximum, a stop command may be generated. In response to a stop command, the controller outputs a control signal to the fuel supply circuit 42 whereby valve 48 will be closed to terminate fuel supply to the engine. After a preset time delay D1 has occurred, as determined in step 281, the controller outputs a control signal to ignition circuit 44 to turn the engine ignition off at step 220. The time delay between cutoff of fuel supply and ignition termination avoids engine backfire and the emissions associated with backfire.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, it is within the contemplation of the invention that the range extender 10 may be utilized as an electric power source for providing electric power to loads with substantial power consumption, such as trucks, recreational vehicles, etc. As the extender is portable for use with different loads at different times, the autonomous extender controller provides flexibility in setting the various thresholds tailored to the particular loads with which the range extender can be utilized.

What is claimed is:

1. A method for controlling a portable range extender capable of supplying electrical energy to a vehicle, the range extender including a dynamoelectric machine mechanically coupled to an internal combustion engine by a shaft and electrically coupled to an electric power source wherein said dynamoelectric machine drives the shaft to start the internal combustion of the engine, comprising:

applying electrical energization from a power source to the dynamoelectric machine for operation as a motor to drive the shaft to start the engine in rotation in response to an initiation input;

sensing the rotational speed of the shaft;

sensing the temperature of the engine;

in response to a sensed rotational speed that meets a first predetermined speed threshold and a sensed engine temperature that meets a predetermined temperature threshold, supplying fuel to the engine and activating an ignition of the engine for operation as a prime mover; and after a period of engine prime mover operation, operating the dynamoelectric machine as a generator to provide an electrical current output.

2. A method as recited in claim 1, wherein:

the power source is a direct current source and applying electrical energization to the dynamoelectric machine comprises inverting an output voltage of the direct current source to an alternating current.

3. A method as recited in claim 2, wherein the direct current source is a battery for operation of a vehicle traction motor.

4. A method as recited in claim 3, wherein operating the dynamoelectric machine as a generator comprises producing an alternating current output of the dynamoelectric machine and converting the alternating current output to a direct current output;

and further comprising applying the direct current output to charge the battery.

5. A method as recited in claim 4, further comprising applying the direct current output to drive the traction motor.

6. A method as recited in claim 1, wherein said period of engine prime mover operation is a predetermined time interval.

7. A method as recited in claim 1, wherein operation of the dynamoelectric machine as a generator is initiated when the sensed shaft rotational speed meets a second predetermined speed threshold higher than the first predetermined threshold.

8. A method as recited in claim 1, further comprising:
  terminating the supply of fuel to the engine when the engine is to be stopped;
  maintaining ignition activation of the engine after the fuel supply has been terminated; and
  deactivating engine ignition when fuel has been eliminated from the engine.

9. A method as recited in claim 8, wherein the deactivating is delayed for a preset time period.

10. A method as recited in claim 8, wherein the range extender is self contained within an enclosure that is independent of a vehicle and the applying of electrical energization to the dynamoelectric machine, supplying fuel to the engine, activating ignition of the engine, activating the dynamoelectric machine, terminating the supply of fuel, and deactivating of the engine ignition are controlled by a controller contained within the enclosure.

11. A portable range extender capable of supplying electrical energy to a vehicle having a vehicle controller, the portable range extender comprising:
  an internal combustion engine;
  a dynamoelectric machine mechanically coupled to the internal combustion engine by a shaft and electrically coupled to a direct current source, the dynamoelectric machine driving the shaft to start the internal combustion of the engine;
  an autonomous range extender controller having at least one user input; and
  a portable enclosure in which the internal combustion engine, dynamoelectric machine and controller are housed; wherein
  in response to a user input to the controller, the controller provides operations including a first phase in which electrical energization is applied from the direct current source to the dynamoelectric machine for operation as a motor to drive the shaft to start the engine in rotation, a second phase in which the engine is activated for operation as a prime mover, a third phase in which the dynamoelectric machine is activated for operation as a generator for providing electrical current to the vehicle.

12. A portable range extender as recited in claim 11, wherein the internal combustion engine comprises an ignition circuit and a fuel supply circuit, each of these circuits coupled to a respective output of the controller.

13. A portable range extender as recited in claim 12, further comprising a speed sensor indicative of shaft speed and an engine temperature sensor, each of these sensors coupled to a respective speed input and temperature input of the controller.

14. A portable range extender as recited in claim 13, wherein the controller provides output signals to the ignition circuit and fuel supply circuit for prime mover activation, the output signals being a function of input signals at the speed and temperature inputs and threshold values.

15. A portable range extender as recited in claim 12, the controller receiving a user termination input and providing an output signal to the fuel supply circuit to shut off the supply of fuel to the engine and, after a preset time delay, providing a signal to the ignition circuit to terminate engine ignition.

16. A portable range extender as recited in claim 11, further comprising an inverter/converter circuit connected to electrical terminals of the dynamoelectric machine and to the controller; and wherein the inverter/converter circuit converts the direct current energization applied in the first phase to the dynamoelectric machine to an alternating current for operation as a motor, and inverts an alternating current output of the dynamoelectric machine in the third phase for operation as a generator.

17. The method of claim 1, the dynamoelectric machine being a three phase AC electric machine.

18. The method of claim 1, the portable range extender being contained in an enclosure that is independent of the vehicle.

19. The method of claim 1, the portable range extender being disposed in the vehicle.

20. The method of claim 19, the portable range extender being movable readily from the vehicle.

21. The method of claim 20, the dynamoelectric machine being a three phase AC electric machine.

22. The method of claim 19, the portable range extender being movable readily from the vehicle to another vehicle.

23. The method of claim 4, the converting of the alternating current output to a direct current output including an inverter/converter module.

24. The method of claim 23, the inverter/converter module inverting a direct current of the direct current source to an alternating current.

25. The method of claim 23, the inverter/converter module converting an alternating current of the alternating current output to a direct current.

26. The method of claim 23, further comprising applying a direct current of the direct current output to drive the traction motor.

27. The method of claim 26, the dynamoelectric machine being a three phase AC electric machine.

28. The method of claim 8, the dynamoelectric machine being a three phase AC electric machine.

29. The range extender of claim 11, the dynamoelectric machine being a three phase AC electric machine.

30. The range extender of claim 11, the portable range extender being contained in an enclosure that is independent of the vehicle.

31. The range extender of claim 11, the portable range extender being disposed in the vehicle.

32. The range extender of claim 31, the portable range extender being movable readily from the vehicle.

33. The range extender of claim 32, the dynamoelectric machine being a three phase AC electric machine.

34. The range extender of claim 31, the portable range extender being movable readily from the vehicle to another vehicle.

35. The range extender of claim 11, further comprising an inverter/converter module.

36. The range extender of claim 35, the inverter/converter module connected to the direct current source and providing an alternating current.

37. The range extender of claim 35, the inverter/converter module connected to an alternating current output of the dynamoelectric machine and providing a direct current output.

38. The range extender of claim 35, the direct current output connected to a traction motor to provide a direct current to drive the traction motor.

39. The range extender of claim 38, the dynamoelectric machine being a three phase AC electric machine.

40. The range extender of claim 12, the dynamoelectric machine being a three phase AC electric machine.

41. A vehicle, comprising:
  a first section having an electric motor electrically connected to a battery and controlled by a vehicle controller; and
  a second section having a dynamoelectric machine mechanically coupled to an internal combustion engine by a shaft and electrically coupled to a direct current source, the dynamoelectric machine driving the shaft to start the internal combustion of the engine, the second section also having an autonomous controller having at least one user input, the second section housed in a portable enclosure, wherein, in response to a user input to the autonomous controller, the autonomous controller initiates a first operational phase in which electrical energization is applied from the direct current source to the dynamoelectric machine for operation as a motor to drive the shaft to start the internal combustion engine in rotation, a second operational phase in which the internal combustion engine is activated for operation as a prime mover, and a third operational phase in which the dynamoelectric machine is operated as a generator to provide an electrical current to at least the first section.

42. The vehicle of claim 41, wherein the internal combustion engine comprises an ignition circuit and a fuel supply circuit, each of these circuits coupled to a respective output of the autonomous controller.

43. The vehicle of claim 42, further comprising a speed sensor indicative of shaft speed and an engine temperature sensor, each of these sensors coupled to a respective speed input and temperature input of the autonomous controller.

44. The vehicle of claim 43, wherein the autonomous controller provides output signals to the ignition circuit and fuel supply circuit for prime mover activation, the output signals being a function of input signals at the speed and temperature inputs and threshold values.

45. The vehicle of claim 42, the autonomous controller receiving a user termination input and providing an output signal to the fuel supply circuit to shut off the supply of fuel to the engine and, after a preset time delay, providing a signal to the ignition circuit to terminate engine ignition.

46. The vehicle of claim 41, further comprising an inverter/converter circuit connected to electrical terminals of the dynamoelectric machine and to the autonomous controller; and wherein the inverter/converter circuit converts the direct current energization applied in the first operational phase to the dynamoelectric machine to an alternating current for operation as a motor, and inverts an alternating current output of the dynamoelectric machine in the third operational phase for operation as a generator.

47. The vehicle of claim 41, the dynamoelectric machine being a three phase AC electric machine.

48. The vehicle of claim 41, the second section being contained in an enclosure that is detachable from the vehicle.

49. The vehicle of claim 41, the second section being detachably disposed in the vehicle.

50. The vehicle of claim 49, the second section being movable readily from the vehicle.

51. The vehicle of claim 50, the dynamoelectric machine being a three phase AC electric machine.

52. The vehicle of claim 49, the second section being movable readily from the vehicle to another vehicle.

53. The vehicle of claim 41, further comprising an inverter/converter module.

54. The vehicle of claim 53, the inverter/converter module connected to the direct current source and providing an alternating current.

55. The vehicle of claim 53, the inverter/converter module connected to an alternating current output of the dynamoelectric machine and providing a direct current output.

56. The vehicle of claim 53, the direct current output connected to a traction motor to provide a direct current to the electric motor of the first section.

57. The vehicle of claim 56, the dynamoelectric machine being a three phase AC electric machine.

58. The vehicle of claim 42, the dynamoelectric machine being a three phase AC electric machine.

* * * * *